US007047336B2

(12) United States Patent
Lin et al.

(10) Patent No.: US 7,047,336 B2
(45) Date of Patent: May 16, 2006

(54) METHOD FOR BLOCKING REQUEST TO BUS

(75) Inventors: Ruei-Ling Lin, Taipei (TW); Sheng-Chung Wu, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 10/428,587

(22) Filed: May 2, 2003

(65) Prior Publication Data
US 2004/0019719 A1 Jan. 29, 2004

(30) Foreign Application Priority Data
Jul. 24, 2002 (TW) .............................. 91116510 A

(51) Int. Cl.
*G06F 13/00* (2006.01)
(52) U.S. Cl. ...................... 710/108; 710/200
(58) Field of Classification Search ................ 710/107, 710/108, 36, 200
See application file for complete search history.

(56) References Cited

U.S. PATENT DOCUMENTS

| 4,495,571 | A | | 1/1985 | Staplin, Jr. et al. | |
|---|---|---|---|---|---|
| 5,740,380 | A | * | 4/1998 | LaBerge et al. | 710/107 |
| 6,026,461 | A | * | 2/2000 | Baxter et al. | 710/244 |
| 6,145,040 | A | | 11/2000 | LaBerge et al. | |
| 6,209,052 | B1 | * | 3/2001 | Chin et al. | 710/109 |
| 6,292,860 | B1 | * | 9/2001 | Cochcroft et al. | 710/108 |
| 6,360,291 | B1 | | 3/2002 | Tavallaei | |
| 2002/0038398 | A1 | * | 3/2002 | Morrison et al. | 710/200 |
| 2002/0147875 | A1 | * | 10/2002 | Singh et al. | 710/305 |
| 2003/0065844 | A1 | * | 4/2003 | Lester et al. | 710/107 |
| 2003/0158984 | A1 | | 8/2003 | Stuber et al. | |

FOREIGN PATENT DOCUMENTS

| JP | 2002-59551 | 9/2000 |
|---|---|---|
| JP | 2001-005775 | 1/2001 |

OTHER PUBLICATIONS

P6 Family of Processors Hardware Development Manual, #244001-001, 82pp, Sep. 1998 (http://developer.intel.com/design/pentiumII/manuals/24400101.pdf), pp. 3-1 to 3-10.*

* cited by examiner

Primary Examiner—Rehana Perveen
Assistant Examiner—Clifford Knoll
(74) Attorney, Agent, or Firm—Madson & Austin

(57) ABSTRACT

A method for blocking a request to a front side bus interconnected between a central processing unit (CPU) and a control chip includes the following steps. First, a bus ownership of the control chip is assigned via a bus priority signal line. Any request from the CPU to the front side bus is blocked when the control chip owns the bus ownership. Meanwhile, any request from the control chip to the front side bus is inhibited when the CPU is blocked from outputting any request to the front side bus.

10 Claims, 4 Drawing Sheets

METHOD FOR BLOCKING REQUEST TO BUS

FIELD OF THE INVENTION

The present invention relates to a method for blocking a request to a bus, and more particularly to a method for blocking a request to a bus that interfaces between a control chip and a central processing unit (CPU) before it is beyond the capacity of the control chip.

BACKGROUND OF THE INVENTION

As is known, a central processing unit (CPU) is electrically connected to a control chip, which is generally a bridge chip, via a front side bus. When the CPU issue a request, e.g. an access request to a memory and/or a read/write request to an I/O device, the control chip will perform the corresponding access or read/write operation according to the request from the CPU.

In general, the CPU is designed with a pipeline for permitting multi-requests at the same time. Complying with the pipeline design of the CPU, the control chip is supposed to be able to deal with the consecutive outstanding requests from the CPU. Therefore, a-queue is built in the control chip for storing the pending requests from the CPU before the requests are processed individually.

The capacities of the CPU and the control chip for processing requests, however, are limited to some extent. When the capacity or the allowed outstanding request number of the control chip is smaller than that of the CPU, the control chip has to timely inform the CPU of the approaching threshold and block any further request from the CPU. In prior art, The CPU is provided therewith a block-next-request (BNR) signal line. In response to a block-next-request signal transmitted on the line, the request from and/or to the CPU is blocked.

Please refer to FIG. 1 that illustrates the relationship between a BNR signal between the CPU and the control chip and an address strobe signal (ADS) generated by the bus owner, i.e. either the CPU or the control chip. When it is the CPU that dominates the bus, the ADS will be pulled "low" for one cycle in order to inform the control chip of the coming request. For example, as shown in FIG. 1, the low level of the ADS at Cycle 2 indicates that the CPU outputs a request. Meanwhile, if the request number stored in the queue of the control chip is determined to approach the limit, the BNR signal is asserted "low" by the control chip at Cycle 2 to suspend next request from the CPU. The CPU first samples the low level of the BNR signal at Cycle 2, and then the last request from the CPU is outputted at Cycle 4 and the request from the CPU is suspended from Cycle 5. The CPU samples the BNR signal at alternate cycles after the suspension, and is allowed to output requests again when detecting a high level of the BNR signal. For example, as shown, the BNR signal is detected to be of a low level at Cycle 4 and Cycle 6. It means that the control chip has no capacity for receiving any further request. Afterwards, at Cycle 8, the BNR signal is detected to be of a high level, so next request from the CPU is allowable to be issued to the control chip. The CPU then outputs a new request to the control chip at Cycle 10. A similar situation occurs in the following cycles. Cycle 18 is the last one when the CPU is allowed to output requests because of the low level of the BNR signal at Cycle 16 to block requests. The CPU is blocked to output any request via the front side bus from Cycle 19 to Cycle 21. Then, the request at Cycle 22 is permissible again due to the high-level of the BNR signal at Cycle 20.

In the prior art, a drive circuit is additionally provided in the control chip for pulling the BNR signal low when necessary so as to block the request from the CPU. The BNR signal occupies one pin of the control chip, and the BNR signal drive circuit also occupies certain area of the control chip. In addition, the BNR signal drive circuit consumes power, which is disadvantageous for electric apparatus.

SUMMARY OF THE INVENTION

Therefore, an object of the present invention is to provide a method for blocking the CPU to issue a request to the front side bus in response to a signal on an existent signal line rather than the specific BNR signal line.

A first aspect of the present invention relates to a method for blocking a request to a bus interconnected between a master device and a target device. The method comprises steps of assigning a bus ownership of the target device by an enabling signal on a bus priority signal line; and inhibiting any request from the target device to the bus while blocking any request from the master device to the bus in response to the enabling signal.

In an embodiment, the master device is a central processing unit (CPU), and the target device is a control chip such as a bridge chip.

In an embodiment, the bus is a front side bus, and the bus priority signal line is a BPRI signal line.

A second aspect of the present invention relates to a method for blocking a request to a front side bus interconnected between a central processing unit (CPU) and a control chip. The method includes steps of assigning a bus ownership of the control chip via a bus priority signal line; blocking any request from the CPU to the front side bus when the control chip owns the bus ownership; and inhibiting any request from the control chip to the front side bus when the CPU is blocked from outputting any request to the front side bus.

A third aspect of the present invention relates to a method for avoiding overload of a target device receiving requests from a master device via a bus. The method comprises steps of detecting a request number to be processed by the target device; assigning a bus ownership of the target device by rendering a first status of a bus priority signal line when the request number reaches a threshold value; blocking any request from the master device and generating no request from the target device to the bus in response to the first status of the bus priority signal line; retrieving the bus ownership by rendering a second status of the bus priority signal line; and allowing the master device to output next request to the bus in response to the second status of the bus priority signal line.

In an embodiment, the first status is a low level, and the second status is a high level.

Preferably, the first status of the bus priority signal line is rendered in response to a specific status, e.g. a high level, of a queue threshold signal inside the target device.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

In general, a CPU is designed with a unidirectional bus priority signal line, which is for example referred to a BPRI signal line, in order for a control chip to output a timely request to the CPU. The request, for example, may be a snoop of an I/O device or a defer reply. The unidirectional bus priority signal line is provided for preventing from the efficiency reduction of the control chip, resulting from the exclusive occupation of the front side bus by the CPU for a long term.

Figure 1:
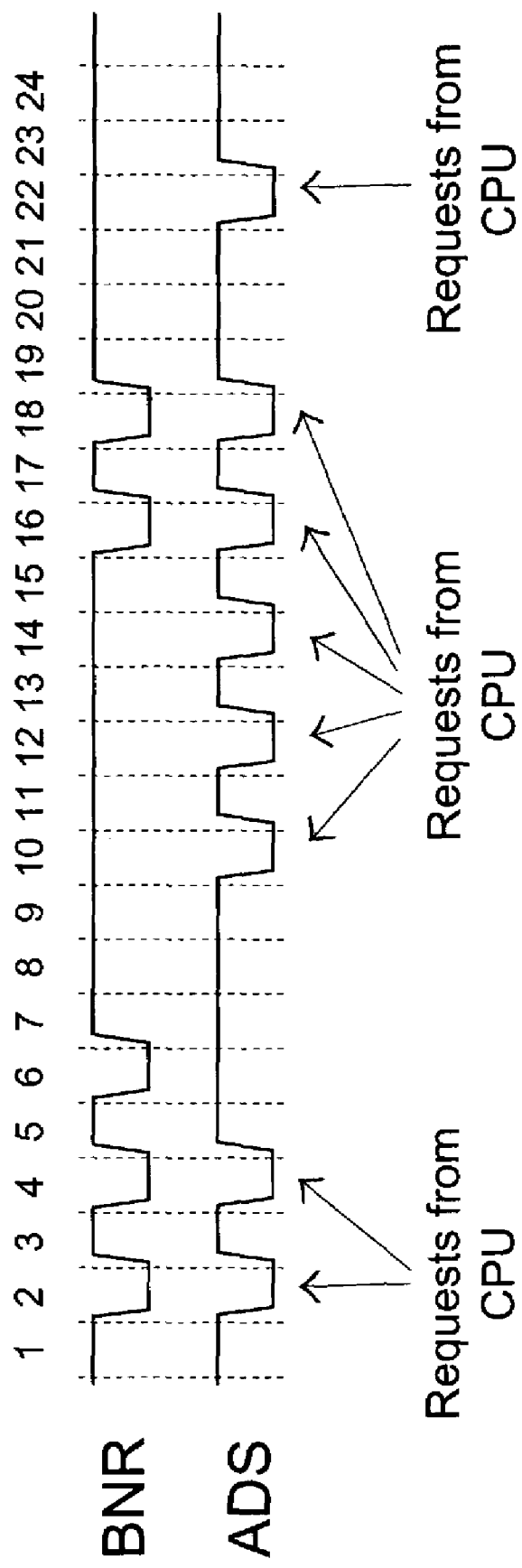
FIG. 1 is a schematic waveform diagram showing the address strobe signal on the bus responding to the BNR signal according to prior art.
Figure 2:
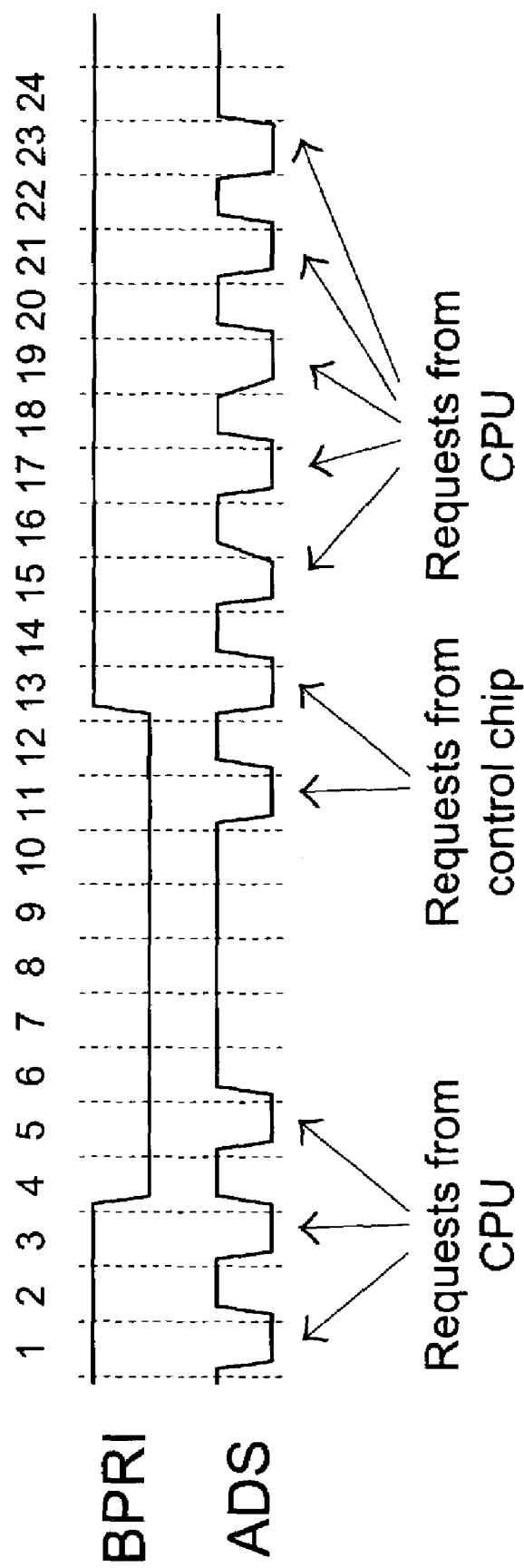
FIG. 2 is a schematic waveform diagram showing the address strobe signal on the bus responding to the BPRI signal according to prior art.

FIG. 2 schematically illustrates the conventional operation principle on the BPRI signal line. At Cycles 1 and 3, the CPU outputs respective requests to the bus, and the ADS signal is in a "low" status for those cycles. Meanwhile, at Cycle 3, the control chip needs to output a timely request to the bus, so the control chip pulls the BPRI signal "low" at Cycle 4 to inform the CPU of the coming request. The CPU thus suspends from outputting any further request and awaits for the request from the control chip from Cycle 6 to Cycle 12. In other words, the CPU can still output a request to the bus at Cycle 5. After the request from the control chip is outputted to the bus at Cycle 11, the control chip pulls the BPRI signal "high" at the end of Cycle 12. Upon the CPU samples the high level of the BPRI signal at Cycle 13, next request from the CPU to the bus is permitted again from Cycle 15. Accordingly, the control chip can still output the last request to the bus at Cycle 13.

Figure 3:
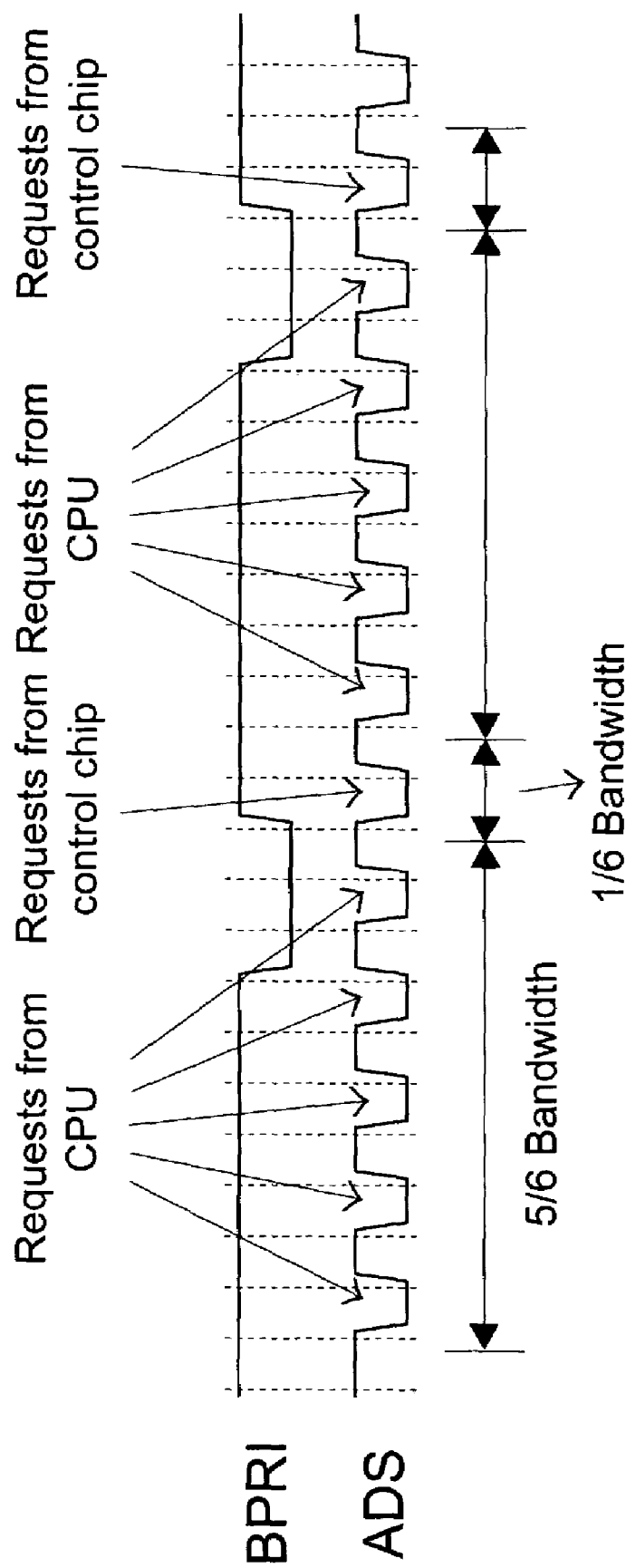
FIG. 3 is a schematic waveform diagram showing the address strobe signal on the bus responding to the BPRI signal according to another prior art.

Another conventional application of the BPRI signal is developed. In this application, the bandwidth of the bus is monitored, and apportioned depending on the use of the devices connected thereto. For example, the ⅚ bandwidth of the bus during a defined period of time is apportioned to the CPU, and the ⅙ bandwidth of the bus is apportioned to the control chip, as shown in FIG. 3. The details of how to monitor and apportion the bus bandwidth is disclosed in the U.S. Pat. No. 6,145,040 assigned to Micron Technology, Inc. (USA), which is incorporated herein for reference.

An embodiment of the present invention utilizes such BPRI signal line or any other bus priority signal line to substitute for the BNR signal line to achieve the purpose of preventing from overload of the control chip. Consequently, the disadvantages of the occupation of an exclusive pin by the BNR signal line and the requirement on the additional drive circuit are overcome.

Figure 4:
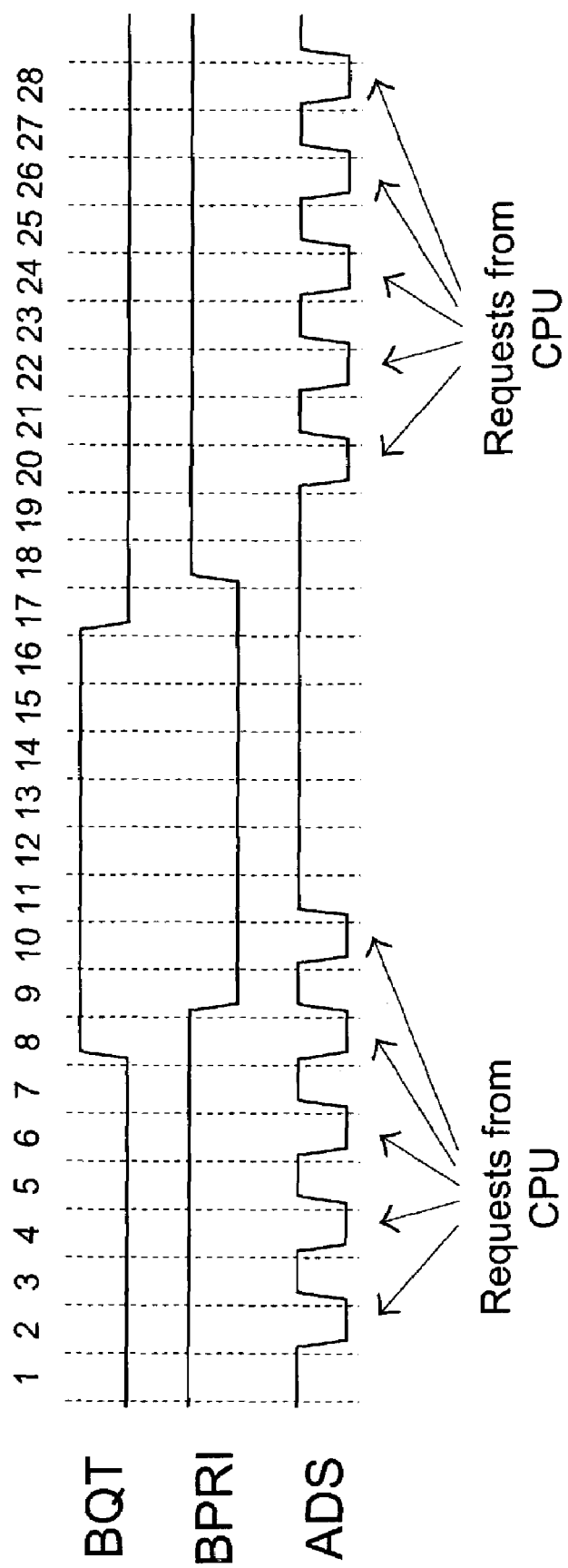
FIG. 4 is a schematic diagram showing the address strobe signal on the bus responding to the BPRI signal according to an embodiment of the present invention.

FIG. 4 schematically shows the address strobe signal on the bus responding to the BPRI signal according to an embodiment of the present invention. The CPU outputs requests to the control chip via the front side bus at Cycles 2, 4 and 6, respectively. After receiving the request of Cycle 6, the bridge queue threshold (BQT) signal inside the control chip for monitoring the request number in the queue of the control chip is pulled "high" at Cycle 8 to inform that the request number reaches a predetermined threshold. In response to the BQT signal, the BPRI signal is pulled "low" at Cycle 9. Accordingly, the CPU is blocked from outputting further requests from Cycle 11. At the end of Cycle 17, the control chip has enough capacity for a further request, and thus the BPRI signal is pulled "high" at Cycle 18 in response to the low level of the BQT signal. Therefore, the CPU is allowed to output next request to the control chip via the bus again from Cycle 20.

It is to be noted that in the above embodiment, the control chip, in spite of being assigned thereto the bus ownership during Cycles 9–17, does not output any request to the bus. In other words, there will be no request on the bus from Cycle 11 to Cycle 19. By this way, the request from the CPU can be blocked at any proper time points without the presence of the BNR signal line and BNR signal drive circuit.

To sum up, a bus priority signal line such as the BPRI signal line in the computer system is used to assign the bus ownership to the control chip for a defined period of time. During the defined period of time, however, the control chip processes previous requests in the queue thereof rather than outputs its own request. Conclusively, the purpose of the BNR signal line for blocking the request to the bus can be similarly achieved by the BPRI signal line. The pin for the BNR signal line and the BNR signal drive circuit for driving the BNR signal line are omitted, thereby minimizing the occupied chip area, package cost and power consumption of the control chip.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for blocking a request to a front side bus interfacing a central processing unit (CPU) with a control chip with a bus priority (BPRI) signal line instead of a blocking next request (BNR) signal line, comprising steps of:

assigning a bus ownership of said front side bus to said control chip in response to an enable signal asserted via a said BPRI signal line;

blocking any request from said CPU to said front side bus when said control chip owns said bus ownership in response to said enable signal; and inhibiting any request from said control chip to said front side bus when said CPU is blocked from outputting any request to said front side bus in response to said enable signal.

2. A method for preventing from overload of a target device receiving requests from a master device via a bus, comprising steps of:

detecting a count of queuing requests to be processed by said target device;

immediately assigning a bus ownership to said target device by rendering a first status of a bus priority signal line when said count of queuing requests reaches a threshold value;

blocking any request from said master device while inhibiting any request from said target device to said bus in response to said first status of said bus priority signal line;

retrieving said bus ownership from said target device by rendering a second status of said bus priority signal line; and allowing said master device to output next request to said bus in response to said second status of said bus priority signal line.

3. The method according to claim 2 wherein said master device is a central processing unit (CPU), and said target device is a bridge chip.

4. The method according to claim 2 wherein said bus is a front side bus and said bus priority signal line is a BPRI signal line in the computer system.

5. The method according to claim 2 wherein said first status is a low level, and said second status is a high level.

6. The method according to claim 2 wherein said first status of said bus priority signal line is rendered in response to a specific status of a queue threshold signal inside said target device.

7. The method according to claim 6 wherein said specific status is a high level.

8. The method according to claim 1 wherein the CPU is provided with a BNR signal line.

9. The method according to claim 8 wherein the control chip omits a pin for the BNR signal line.

10. The method according to claim 9 wherein the control chip omits a signal drive circuit for driving the BNR signal line.

* * * * *